Patented Apr. 13, 1948

2,439,426

UNITED STATES PATENT OFFICE 2,439,426

CONVERSION OF SATURATED ALIPHATIC CARBOXYLIC AMIDES TO NITRILES

William F. Gresham, Wilmington, Del., assignor to E. I. du Pont de Nemours & Company, Wilmington, Del., a corporation of Delaware No Drawing. Application July 27, 1946, Serial No. 686,724

7 Claims. (Cl. 260—465.2)

This invention relates to the synthesis of nitriles and more particularly to the synthesis of lower aliphatic mono- and di-nitriles by the simultaneous dehydration of aliphatic acid amides to the corresponding nitriles and the conversion of carbon monoxide and water to hydrogen and carbon dioxide in the presence of specific catalysts which are set forth hereinafter.

It has long been known that carboxylic acid amides may be converted to nitriles by heating in the vapor phase in the presence of catalytic materials such as boron phosphate, aluminum oxide, silica gel and the like. A serious difficulty in the previously known processes for converting amides to nitriles has been the high endothermic heat effect which accompanies the reaction. For example, the dehydration of propionamide to propionitrile is endothermic to the extent of about 16,500 calories per gram molecule. Preparation of nitriles from carboxylic acid amides on a large scale has therefore been extremely difficult, since the rate of conversion of the amide to nitrile has been limited by the rate at which heat can be transferred into the reaction mixture.

An object of this invention is to provide an improved process for the preparation of nitriles from carboxylic acid amides. A further object of the invention is to provide a process whereby the rate of conversion of an amide to nitrile is not limited by the rate of heat transfer through the walls of the reaction vessel. Another object of the invention is to provide a process for manufacturing nitriles from amides in very high yield. A still further object is to provide a catalyst whereby the conversion of amides to nitriles and the conversion of carbon monoxide and water to hydrogen and carbon dioxide may take place simultaneously and at suitable relative rates so that the endothermic effect of the amide dehydration is compensated, at least in part, by the exothermic heat effect of the reaction between carbon monoxide and water to form hydrogen and carbon dioxide.

These objects are accomplished in accordance with the invention by simultaneously dehydrating a carboxylic acid amide, and converting carbon monoxide and water to hydrogen and carbon dioxide, in the presence of a water-gas reaction catalyst, i. e., a catalyst which is known to be effective for the oxidation of carbon monoxide by water ("Catalysis," by Berkman, Morrell and Egloff, 1940, page 775 et seq.). The preferred catalysts are the chromites of iron, nickel, and manganese. Other suitable catalysts include copper-zinc and copper-zinc chromite. The temperature at which the compensating heat effects are realized in accordance with the invention is within the range of about 200 to 475° C., preferably about 320° to 450° C.

The amides which may be employed in the practice of the invention are the amides of carboxylic acids having at least 2 and preferably not more than 20 carbon atoms per molecule. Excellent results are obtained with amides of carboxylic acids of the class consisting of alkanoic and alkandioic acids, said carboxylic acids having from 2 to 6 carbon atoms per molecule.

The initial molar ratio of amide: $CO+H_2O$ is generally within the range of 1:4 to 1:20, the $CO:H_2O$ ratio being preferably about 2:1 to 1:2.

The invention is illustrated further by means of the following examples.

*Example 1.*—A mixture containing propionamide (space velocity, 1860), water (space velocity, 11,000), and carbon monoxide (space velocity, 8720) was passed over an iron chromite catalyst at a temperature of about 360° C., the water and amide having been vaporized and preheated separately. A 90.9% yield of propionitrile (40.8% conversion) was thus obtained without the introduction of heat to maintain the reacting substances at the reaction temperature. The resulting product was isolated by passing the effluent gases through a condenser and distilling the condensate thus obtained. In addition to the propionitrile the product contained about 3.2% of diethyl ketone.

*Example 2.*—Example 1 was repeated at a temperature of about 440° C., the yield of propionitrile was 77%, and the conversion based on the propionamide introduced was 68%.

It is to be understood that the above examples are illustrative only and that the invention is not necessarily limited thereby. In place of propionamide, other amides such as acetamide, isobutyramide, succinic diamide, adipic diamide, etc., are operative in precisely the same manner. Numerous other modifications of the invention will occur to those who are skilled in the art. For example, mixed catalysts containing, in addition to the chromites of iron, nickel, and/or manganese, various promoters or supports such as silica gel, kieselguhr, boric oxide, and the like may be used if desired. In general it is preferable, although not indispensably necessary, to preheat the amide and water to the desired temperature, e. g. about 320° to 450° C., prior to passing these reactants over the catalyst with carbon monoxide. Any convenient method may be employed for recycling the recovered unreacted amide and the uncondensed products including carbon monoxide. If desired, the uncondensed products may be scrubbed for removal of carbon dioxide prior to recycling; moreover, hydrogen may be separated from the recovered carbon monoxide prior to recycling the latter, if desired.

Since many embodiments of the invention may be made without departing from the spirit and scope thereof, it is to be understood that I do not limit myself except as set forth in the following claims.

I claim:

1. A process for the synthesis of nitriles which comprises passing an amide of a carboxyalkane having from 2 to 20 carbon atoms per molecule, with carbon monoxide and steam, over a water-gas reaction catalyst at a temperature of about 200° to 475° C., and thereafter separating from the reaction mixture the nitrile produced by the ensuing reaction.

2. A process for the synthesis of propionitrile which comprises passing propionamide with carbon monoxide and steam over an iron chromite catalyst at a temperature of about 200° to 475° C., and thereafter separating from the resulting reaction mixture the propionitrile produced by the ensuing reaction.

3. A process for the synthesis of nitriles which comprises heating an amide of a carboxyalkane having not more than 2 carboxyl groups per molecule and having from 2 to 6 carbon atoms per molecule at a temperature of 200° to 475° C. with steam and carbon monoxide in the presence of a water-gas reaction catalyst, the initial molal ratio of amide: $CO+H_2O$ being within the range of 1:4 to 1:20, the $CO:H_2O$ ratio being about 2:1 to 1:2, whereby the endothermic heat of the resultant dehydration of the amide to nitrile is at least partially compensated by the exothermic heat of the resultant conversion of carbon monoxide and steam to carbon dioxide and hydrogen, and thereafter separating the said nitrile from the resulting reaction mixture.

4. A process for the synthesis of nitriles which comprises heating an amide of a carboxyalkane having not more than 2 carboxyl groups per molecule and having from 2 to 6 carbon atoms per molecule at a temperature of 200° to 475° C. with steam and carbon monoxide in the presence of iron-chromite catalyst, the initial molal ratio of amide: $CO+H_2O$ being within the range of 1:4 to 1:20, the $CO:H_2O$ ratio being about 2:1 to 1:2, whereby the endothermic heat of the resultant dehydration of the amide to nitrile is at least partially compensated by the exothermic heat of the resultant conversion of carbon monoxide and steam to carbon dioxide and hydrogen, and thereafter separating the said nitrile from the resulting reaction mixture.

5. A process for the synthesis of propionitrile which comprises heating propionamide at a temperature of 200° to 475° C. with steam and carbon monoxide in the presence of iron-chromite catalyst, the initial molal ratio of amide: $CO+H_2O$ being within the range of 1:4 to 1:20, the $CO:H_2O$ ratio being about 2:1 to 1:2, whereby the endothermic heat of the resultant dehydration of the amide to nitrile is at least partially compensated by the exothermic heat of the resultant conversion of carbon monoxide and steam to carbon dioxide and hydrogen, and thereafter separating the said nitrile from the resulting reaction mixture.

6. A process for the synthesis of nitriles which comprises separately heating an amide of a carboxyalkane having not more than 2 carboxyl groups per molecule and having from 2 to 6 carbon atoms per molecule and steam to a temperature of about 320° to 450° C. and thereafter passing the said amide and the said steam together over an iron chromite catalyst in the presence of carbon monoxide, the initial molal ratio of amide: $CO+H_2O$ being within the range of 1:4 to 1:20, the $CO:H_2O$ ratio being about 2:1 to 1:2, whereby the endothermic heat of the resultant dehydration of the amide to nitrile is at least partially compensated by the exothermic heat of the resultant conversion of carbon monoxide and steam to carbon dioxide and hydrogen, and thereafter separating the said nitrile from the resulting reaction mixture.

7. A process for the synthesis of propionitrile which comprises preheating propionamide and steam separately to a temperature of about 320° to 450° C. and thereafter passing the said amide and the said steam together over an iron chromite catalyst in the presence of carbon monoxide, the initial molal ratio of amide: $CO+H_2O$ being within the range of 1:4 to 1:20, the $CO:H_2O$ ratio being about 2:1 to 1:2, whereby the endothermic heat of the resultant dehydration of the amide to nitrile is at least partially compensated by the exothermic heat of the resultant conversion of carbon monoxide and steam to carbon dioxide and hydrogen, and thereafter separating propionitrile from the resulting reaction mixture.

WILLIAM F. GRESHAM.

REFERENCES CITED

The following references are of record in the file of this patent:

UNITED STATES PATENTS

| Number | Name | Date |
| --- | --- | --- |
| 2,061,314 | Ralston et al. | Nov. 17, 1936 |
| 2,132,849 | Greenewalt et al. | Oct. 11, 1938 |

OTHER REFERENCES

McMaster et al., Jour. Am. Chem. Soc., vol. 40, pages 970–973 (1918).